United States Patent [19]

Hedblom

[11] Patent Number: 5,227,221
[45] Date of Patent: * Jul. 13, 1993

[54] PATTERNED SKID PREVENTATIVE SHEET

[75] Inventor: Thomas P. Hedblom, Eagan, Minn.

[73] Assignee: Minnesota Mining and Manufacturing Company, St. Paul, Minn.

[*] Notice: The portion of the term of this patent subsequent to Jan. 29, 2008 has been disclaimed.

[21] Appl. No.: 645,552

[22] Filed: Jan. 24, 1991

Related U.S. Application Data

[63] Continuation of Ser. No. 459,940, Jan. 2, 1990, Pat. No. 4,988,555, which is a continuation of Ser. No. 204,349, Jun. 9, 1988, abandoned.

[51] Int. Cl.[5] .......................... B32B 18/00; E01F 9/00
[52] U.S. Cl. ...................................... 428/172; 428/156; 428/167; 428/143; 428/323; 428/402; 427/137; 404/12; 404/14; 404/94
[58] Field of Search ............... 428/172, 180, 329, 321, 428/915, 402, 325, 163, 168, 173, 204, 131, 142, 141, 143, 166, 167, 328, 156, 323, 409; 404/9, 12, 14, 16, 93, 94, 10, 19, 94; 427/137, 136, 138; 501/34

[56] References Cited

U.S. PATENT DOCUMENTS

| | | | |
|---|---|---|---|
| 2,108,645 | 2/1938 | Bryant | 91/68 |
| 3,418,896 | 12/1968 | Rideout | 94/1.5 |
| 3,935,365 | 1/1976 | Eigenmann | 428/322 |
| 4,020,211 | 4/1977 | Eigenmann | 428/323 |
| 4,040,760 | 8/1977 | Wyckoff | 404/14 |
| 4,069,281 | 1/1978 | Eigenmann | 264/1 |
| 4,117,192 | 9/1978 | Jorgensen | 428/337 |
| 4,248,932 | 2/1981 | Tung | 428/325 |
| 4,381,388 | 4/1983 | Naples | 528/59 |
| 4,388,359 | 6/1983 | Ethen | 428/143 |
| 4,490,432 | 12/1984 | Jordan | 428/220 |
| 4,530,859 | 7/1985 | Grunzinger | 427/385.5 |
| 4,681,401 | 7/1987 | Wyckoff | 350/105 |
| 4,758,469 | 7/1988 | Lange | 428/325 |
| 4,937,127 | 6/1990 | Haenggi et al. | 428/148 |
| 4,988,555 | 1/1991 | Hedblom | 428/167 |
| 5,094,902 | 3/1992 | Haenggi et al. | 428/150 |

*Primary Examiner*—Donald J. Loney
*Attorney, Agent, or Firm*—Gary L. Griswold; Walter N. Kirn; Karl G. Hanson

[57] ABSTRACT

A polymeric base sheet has a plurality of protuberances and valleys located on a first side of the base sheet. A layer of bonding material is located on a top surface of the protuberances and is substantially absent from the valleys located between the protuberances. A plurality of skid-preventative particles are secured to the layer of bonding material so as to be substantially absent from the valleys. A sheet of this construction allows the skid-preventative particles to be used in a more efficient manner than heretofore known. By placing the skid-preventative particles exclusively on the protuberances of the base sheet, less particles need to be employed to obtain the skid-preventative surface.

9 Claims, 4 Drawing Sheets

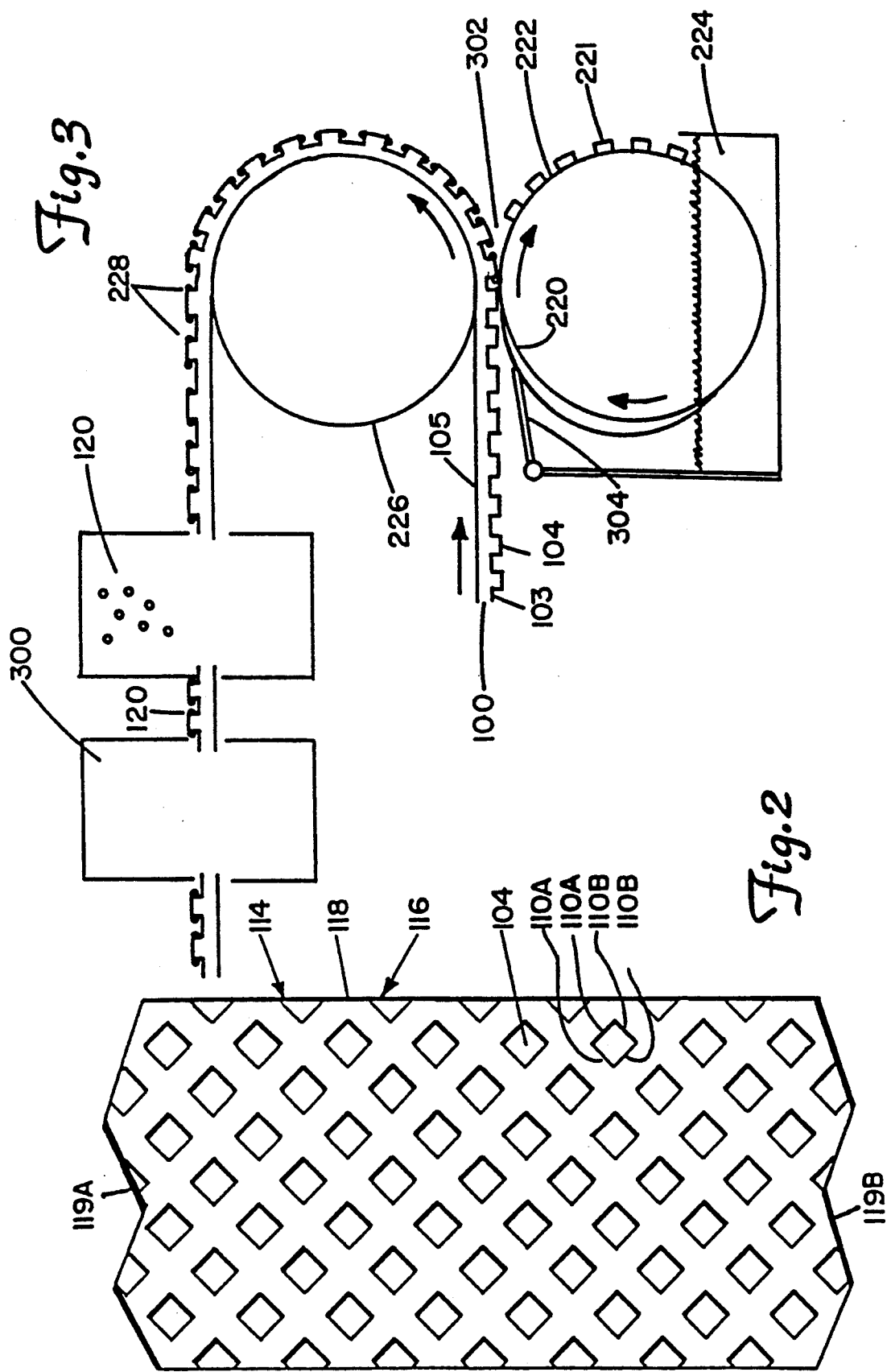

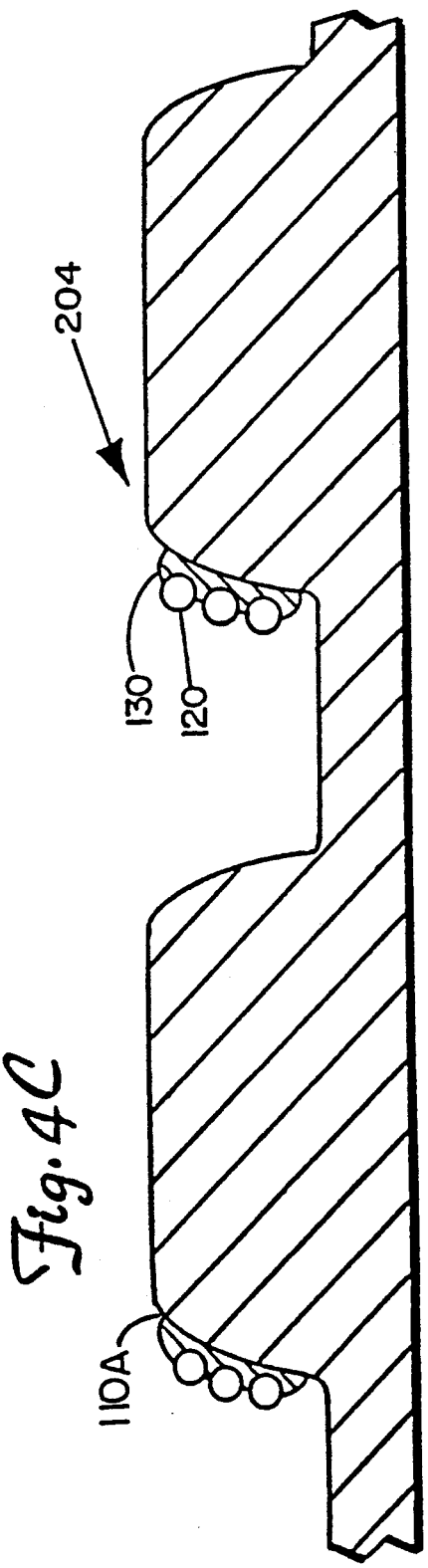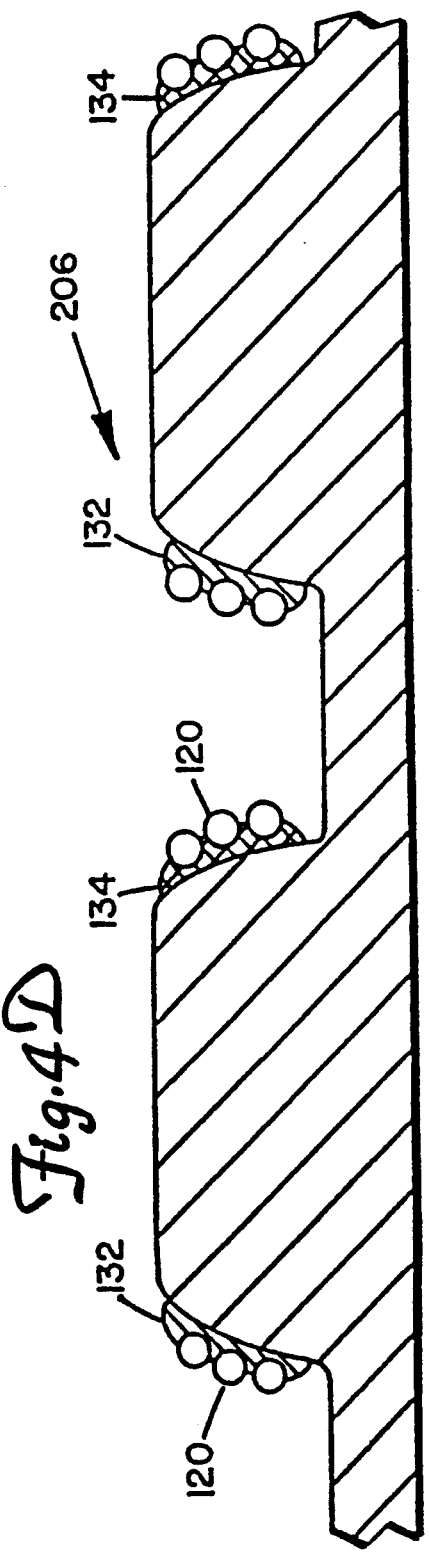

PATTERNED SKID PREVENTATIVE SHEET

This is a continuation of U.S. application Ser. No. 07/459,940 filed Jan. 2, 1990 now U.S. Pat. No. 4,988,555 which is a continuation of U.S. application Ser. No. 07/204,349 filed Jun. 9, 1988 now abandoned. The disclosures of these applications are incorporated here by reference.

BACKGROUND OF THE INVENTION

This invention pertains to a sheet for placement on a roadway, and more particularly to a sheet having skid preventative particles secured thereon. This invention also pertains to a method of using and making such sheets.

U.S. Pat. No. 4,069,281 discloses a prefabricated roadway marking strip material including a base layer and a traffic-regulating, sign-forming and traffic wear-resisting upper layer having a generally smooth surface. Spaced protuberances bulge from the surface and retroreflective elements are concentrated on the top portion of the protuberances. The protuberances are thick portions of the generally smooth upper layer.

Another road marking material is described in U.S. Pat. No. 3,935,365. The material is formed by embossing spaced transverse protrusions on extruded stock. Beads are placed on each transverse protrusion to provide reflectorized flanks.

An alternative product is disclosed in U.S. Pat. No. 4,681,401 (Wyckoff). The product includes flattened, somewhat saw-toothed shaped wedges embodying retroreflective material and of preferably substantially trapezoidal shape.

Another method of forming a raised pattern on a pavement-marking sheet material is disclosed in U.S. Pat. No. 4,388,359. The preparation of the material includes depositing a monolayer of microspheres on a base sheet and embossing the microsphere-covered base sheet so as to deform the base sheet and form protuberant areas separated by depressed areas. The embossing step partially embeds the glass microspheres into the base sheet in the protuberant areas and can fully embed the microspheres into the base sheet into the depressed areas.

SUMMARY OF THE INVENTION

This invention includes a sheet having skid preventative particles placed thereon. The sheet comprises a polymeric base sheet having a plurality of protuberances located on a first side of the base sheet. The skid preventative particles are secured to the protuberances by a layer of bonding material. The layer of bonding material is located on the protuberances but is substantially absent from the valleys. In this way the skid preventative particles are secured to the protuberances but not to the valleys.

This invention also includes a method of making a skid preventative sheet. The method comprises securing skid preventative particles to top surfaces of protuberances on a first side of a base sheet. The skid preventative particles are secured to the top surfaces of the protuberances in a manner that allows the skid preventative particles to be substantially absent from valleys separating the protuberances.

BRIEF DESCRIPTION OF THE DRAWINGS

FIG. 2 is a top view of the base sheet and protuberances.

FIG. 3 is a schematic view of the process.

FIGS. 4A, 4B, 4C, 4D and 4E are cross-sectional views of embodiments of the subject invention.

DETAILED DESCRIPTION OF THE PREFERRED EMBODIMENTS

This invention is a pavement sheet having protuberances and valleys located on a first side of a base sheet. Skid preventative particles are secured to the protuberances but are substantially absent from the valleys of the base sheet. This skid preventative sheet may be formed by a novel process of this invention.

The novel process involves four main steps. First, a resilient base sheet with resilient protrusions is provided. Second, a liquid bead bond layer is selectively applied to desired surfaces of the protrusions. The remaining surfaces of the protrusions and base sheet remain substantially free of bead bond. Third, skid-preventing particles are embedded in the liquid bead bond layer. Fourth, the liquid bead bond layer is solidified, thereby stabilizing the location of the embedded particles. Variations in the components employed and variations in process step parameters can produce an array of useful products. Additionally, certain process steps may be repeated in the course of the process using alternative parameters and alternative components to further broaden the array of useful products.

The first major component required to carry out the process is a resilient polymeric base sheet having a plurality of protrusions projecting from a surface of the sheet. The tops of the protrusions essentially define a plane substantially parallel to the surface of the sheet. The protrusions need not necessarily be regularly shaped, sized, or spaced apart for the process to successfully apply liquid bead bond to selected surface portions. However, the process of this invention is more easily understood and explained with reference to the preferred embodiment which includes regularly shaped, sized and spaced integral protrusions projecting from a base sheet.

A suitable base sheet may preferably be formed using known methods and materials, such as described in U.S. Pat. No. 4,388,359, which is incorporated herein by reference. The embossed base sheet described in the patent comprises elastomer precursors, not yet vulcanized or cured, which therefore permit viscoelastic deformation. Exemplary materials are acrylonitrile-butadiene polymers, millable urethane polymers and neoprenes. Extender resins may be included. Particulate fine-diameter fillers such as silica, asbestos, etc. may be included, however, environmental health considerations may advise against asbestos incorporation. Pigments, such as titanium dioxide are preferred in the base sheet to provide a white diffuse surface to uncoated portions of the base and protrusions. Another useful pigment is lead chromate which imparts a yellow color. The base sheet, however, departs from the disclosure of U.S. Pat. No. 4,388,359 in that a mono-layer of transparent microspheres is not deposited prior to embossing. In one alternative embodiment, however, skid prevention particles are partially embedded in the base sheets during embossing.

Figure 1:
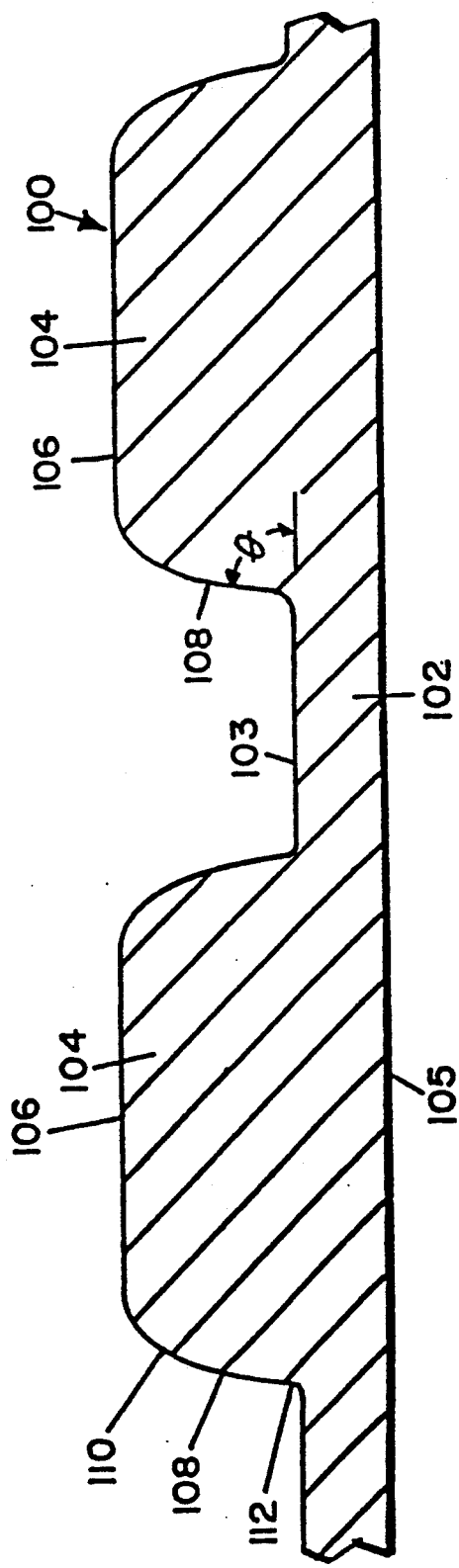
FIG. 1 is a cross-sectional view of a base sheet with protuberances.

The preferred resilient polymeric base sheet, preferably a web, is generally shown as 100 in FIG. 1. The sheet 100 includes a base 102 and a plurality of protrusions 104. The protrusions 104 are an integral part of the base sheet 102 and have a top surface 106 and a side surface 108. The protrusions 104 typically have a height of approximately 1.1 mm (1.0, 1.8 and 2.5 mm alternative embodiments have also been tested). The base 102 has a front surface 103 from which the protrusions extend and a back surface 105 and typically has a thickness of approximately 0.64 mm. The side surfaces 108 meet the top surface 106 at a rounded top portion 110. The side surfaces 108 meet the front surface 103 at a lower portion 112. The side surfaces 108 may form an angle $\theta$ of approximately 70°–72° at the intersection of front surface 103, with the lower portion 112 of the side surface 108.

The protrusions 104 are disposed upon the base 102 in rows 114 and columns 116, each oriented at about 45° to an edge 118 of the base sheet 102 as shown in FIG. 2. If the base sheet 100 is a web, then an upweb direction 119A and a downweb direction 119B are also present. By "upweb" is meant the direction of web portions to which bead bond has not yet been applied. By "downweb" is meant the direction of web portions to which bead bond has previously been applied. The protrusions 104 have a generally square outline such that the side surface 108 of each of the protrusions 104 is divided into four roughly equal parts, each having a top portion 110. Two of the top portions 110A face the upweb direction 119A and two of the top portions 110B face the downweb direction 119B. The length of the portions 110 of the protrusions 104 is typically about 6.4 mm. The rows 114 and columns 116 are spaced apart a distance approximately 3.2 mm, however, alternative spacings up to about 6.4 mm have also been successfully tested.

In the second step of the process, a layer of liquid bead bond material is applied to selected portions of the protrusions 104. In a most elementary form of the second step, a film of liquid bead bond is contacted with the top surface 106 of the protrusions 104. The second step may be carried out by employing a film of liquid bead bond supported by a release liner or sheet. Portions of the film are laminated to portions of the protrusions. Subsequently, the release liner is stripped off or removed, thereby leaving the protrusion surfaces selectively printed with liquid bead bond. If the release liner is pressed hard against the top surface 106 of the protrusions 104, the liquid bead bond is displaced from the top surface 106 to the side surface 108.

A more sophisticated continuous process involves a film of bead bond supported on a roller.

The continuous process for applying transparent bead lens elements to the base retroreflecting sheet is schematically presented in FIG. 3. The web 100 of base sheet material is oriented with the protrusions 104 projecting downward from the surface 103 and back surface 105 oriented upward. The protrusions 104 contact a film 220 of liquid bead bond. The film 220 is provided by a print roller 222 which is partially immersed in a reservoir or pool of liquid bead bond 224. A backing roller 226 contacts the back surface 105 of the web 100. As the print roller 222 rotates through the reservoir of liquid bead bond 224 the film 220 is formed on the print roller. As the rotation continues, the film 220 contact the protrusions 104. The web 100 is also advanced by the rotation of the backing roller 226. As the protrusions 104 contact the film 220, a discontinuous layer of bead bond 228 is applied to or printed on the protrusions 104. Non-adhering portions 221 of the film 220 returns to the reservoir 224 on the print roller 222.

Suitable bead bond material may be either a thermoplastic or thermosetting polymeric binder. One such binder is a vinyl-based thermoplastic resin including a white pigment, as described in U.S. Pat. No. 4,117,192 incorporated herein by reference. Other suitable bead bond materials include two-part polyurethane formed by reacting polycaprolactone diols and triols with derivatives of hexamethylene diisocyanate; epoxy based resins as described in U.S. Pat. No. 4,248,932, U.S. Pat. No. 3,436,359, and U.S. Pat. No. 3,580,887; and blocked polyurethane compositions as described in U.S. Pat. No. 4,530,859. Also suitable as a bead bond material are polyurethane compositions comprised of a moisture activated curing agent and a polyisocyanate prepolymer. The moisture activated curing agent is preferably an oxazolidene ring. Such compositions are described in U.S. Pat. No. 4,381,388.

The preferred polyurethane bead bond is formed by first reacting two equivalents of methylene bis (4-cyclohexyl isocyanate) ($H_{12}MDI$) with one equivalent of a polycaprolactone triol of molecular weight about 540 and hydroxyl number about 310 (i.e., a 2-oxypanone polymer with 2-ethyl-2-(hydroxymethyl)-1,3 propanediol) using dibutyltindilaurate as a catalyst. The reaction is carried out in 2-ethoxyethyl acetate and cyclohexanone. To 25 parts of prepolymer is also added 20 parts of a 60/40 pigment dispersion of either titanium dioxide or lead chromate in a diglycidyl ether of bisphenol A epoxy resin (a suitable source is Stan-Tone® 10 EPXO3 or 30 EPXO3 made by Harwick Chemical Corp. of Akron, Ohio). Zinc 2-ethylhexanoate catalyst is added to the bead bond mixture shortly before printing. Inclusion of up to about 10% 2,4 pentanedione in the preferred bead bond extends the pot life of the bead bond from about 1.5 hours to about 15 hours without affecting bead retention.

Useful ranges of pigment dispersion which may be included are 10–30 parts per 25 parts of urethane prepolymer. Hydrogenated epoxies may also be employed. Other useful pigments include nacreous pigments, such as lead sulfate; specular reflectors, such as metallic (for example aluminum) powder or flakes, as well as yellow iron derived pigments. Other pigments typically used for coloring pavement markings may also be used.

Generally, suitable bead bond materials, such as described above, are characterized by excellent adhesion to beads or particles which are subsequently embedded in the bead bond layer. Additionally, the bead bond layer strongly adheres to the base sheet material, is highly cohesive and resistant to environmental weathering.

After the bead bond is applied, the web is inverted such that the protrusions 104 including the selectively printed layer of bead bond 228 face upward. Retroreflecting beads 120 are applied to the web 100 and become partially embedded in the still liquid bead bond 228. The beads 120 may be applied by a flood coating process which results in a dense packing of retroreflecting beads 120 in the surface layer 228 of liquid bead bond. Alternatively, the beads may be sprinkled or cascaded upon the web 100 such that a dense packing of retroreflecting beads 120 in the liquid bead bond 228 is avoided. The sprinkling process is especially advantageous for further decreasing bead usage and further decreasing dirt retention between beads.

Particles such as retroreflective beads suitable for use in the process include glass beads formed of glass materials having indices of refraction (n) from about 1.5 to about 1.9. As is well known in the art, glass beads of material having an index of refraction of about 1.5 are less costly and more scratch and chip resistant than glass beads of material having an index of refraction of from about 1.75 to about 1.9. However, the cheaper, more durable glass beads are less effective retroreflectors. In one embodiment, the glass beads may include a silver or other specular reflective metallic or dielectric coating. The non-embedded portion of the silver coat is subsequently removed to provide a highly effective retroreflector. In another embodiment, beads having a hemispheric coating of a specular reflective metal, such as silver, are applied to the liquid bead bond layer. Because the beads are randomly oriented when applied, a fraction of the beads become embedded in an orientation which is effective for retroreflection. Generally, the effectively oriented beads have the uncoated surface exposed and the silver coated surface embedded.

Preferred retroreflector beads are disclosed in U.S. Pat. No. 4,564,556 and copending application Ser. No. 35,989, filed Apr. 8, 1987, which are incorporated herein by reference. They are described generally as solid, transparent, non-vitreous, ceramic spheroids comprising at least one crystalline phase comprised of at least one metal oxide. They may also have an amorphous phase such as silica. The term non-vitreous means that they have not been derived from a melt or mixture of raw materials brought to liquid state at high temperature, like glass. These spheroids are very resistant to scratching and chipping, being quite hard (e.g., above 700 Knoop) and they can be made with a relatively high index of refraction (ranging between 1.4 and 2.6). Examples of the compositions of these beads are zirconia-alumina-silica and zirconia-silica.

The retroreflector beads preferably have a diameter compatible with the size, shape, spacing and geometry of the protrusions present upon the base sheet. For the earlier described base sheet 100, beads of from 50–350 micrometers diameter may be suitably employed. Other factors affecting bead size are the number of rows of beads desired to be available to vehicle headlights. At an angle of about 2°–3° from the base sheet 100 only about 380 micrometers of side surface is visible. Thus, only about 1 row of 300 micrometer beads is visible, or about 2 rows of 225 micrometer beads. Preferably, 225 micrometer beads are employed in order to reduce the criticality of bead retention.

The approximate weight of typical ceramic beads with a density of approximately 4.0 grams per cubic centimeter, corresponding to flood coatings (i.e., a monolayer of beads over all surfaces except the back surface 105) of the entire surface of the protrusion 104 and front surface 103 of the base sheet 102 is given in Table I. Levels of bead application for selectively applied beads range from just greater than 0% to about 100% of flood coat. Preferred levels, however, are from 15–50% of flood coat, with about 30% being most preferred. Another consideration is the relationship of the bead bond layer to bead size. Unlike flat pavement marking constructions, beads will retroreflect on the side surfaces of the protrusions when deeply embedded, as long as a portion of the bead surface is exposed. Preferably, beads should be embedded up to approximately 50–70% of their diameter in the liquid bead bond layer for an acceptable comprise between bead retention in the field and ability to retroreflect light. Retention of glass beads may also be improved by silane treatment.

Additionally, the process is applicable to selective embedding of skid prevention particles such as sand, $Al_2O_3$, etc.

TABLE I

| Bead Size (Micrometers) | 100% Flood Coat (kg/m$^2$) |
| --- | --- |
| 50–100 | 0.14 |
| 100–150 | 0.21 |
| 100–200 | 0.25 |
| 150–200 | 0.31 |
| 200–250 | 0.40 |

In the fourth step of the process, the liquid bead bond is solidified, thereby locking the retroreflecting beads in the partially embedded position within the bead bond layer. The particular solidification step employed depends on the nature of the bead bond. For polyurethane type bead bonds, solidification may be accomplished by elevation of the temperature to encourage a polymerization reaction. Alternative means of solidifying the bead bond such as cooling of a thermoplastic bead bond are also envisioned. For the preferred polyurethane bead bond, a temperature of about 177° C. for approximately 10 minutes results in rapid solidification of the bead bond and excellent bead retention properties in the field. An oven 300 is useful for providing the temperatures to cause solidification. For the continuous process, the oven may be a tunnel arrangement.

Retroreflecting beads contacting the web 100 but not encountering the liquid bead bond may subsequently be removed by either an inversion step with vibration or a vacuum step thereby allowing non-embedded beads to be saved and reused.

A number of critical factors in the process of forming these retroreflective sheets determine both the effectiveness of the process and the nature of the product which will be produced. Particularly important among these parameters are pressure applied at the nip 302 and speed of the web 100 relative to the film 220. By "nip" 302 is meant the region between the rollers 222 and 226 through which the web 100 passes.

Nip pressure controls the displacement of liquid bead bond from the top surface 106 to the side surface 108. By "nip pressure" is meant the pressure between the rollers 222 and 226 when the web 100 and bead bond are included. Increasing the nip pressure causes the protrusions 104 to project through the bead bond film 220 and essentially contact or nearly contact the print roller 222, as shown in FIG. 3. The contact between the protrusions 104 and the print roller 222, results in a displacement of the liquid bead bond from the top surface 106 of the protrusion 104. The displaced bead bond liquid contacts the side surfaces 108 of the protrusions 104 and remains as a layer on the side surfaces 108 of the protrusions 104 when the web 100 is separated from the print wheel 222.

Several factors affect transfer of bead bond onto the side surfaces, such as adjustment of nip pressure and the hardness of the surfaces of the print roller 222 and the backing roller 226. The backing roller 226 should preferably be hard material such as steel, although hard rubber rollers having a surface harder than about 75 Shore A units may be employed. Insufficiently hard rollers absorb a portion of the nip pressure. Insufficient nip pressure results in incomplete displacement of bead bond from the top surface 106. Excessively soft print rollers 222 and low nip pressure result in application of bead bond over the entire surface of the protrusions 104. Excessively soft print rollers and moderate nip pressures result in application of bead bond over both the front surface 103 and the entire surface of the protrusions 104. In effect, selectivity of application of bead bond is lost by employing excessively soft print rollers 222.

Other factors are the viscosity of the liquid bead bond and the thickness of the bead bond film 220 upon the print roller 222. Generally, any liquid bead bond with a viscosity suitable for coating may be applied by this process. In the particular case of the web pattern earlier described, a polyurethane based bead bond 220 preferably has a viscosity at 24° C. of between about 1800 cps and about 10,000 cps as measured on a Brookfield Viscometer. Most preferably, the viscosity at 24° C. should be from about 3000 to about 7000 cps.

The thickness of the film 220 on the print wheel 222 should be from about 200 to about 500 micrometers thick and preferably about 300 micrometers thick. However, the thickness of the film 220 should be sufficient to provide a wet liquid bead bond layer on the selected surfaces of the protrusions of suitable thickness and viscosity such that the subsequently applied retroreflecting beads may be embedded to a depth of about 40–60% of the diameter of the bead. Thus, the thickness of the film 220 may be partially determined by the bead thickness. A doctor bar 304 may be employed to regulate the film thickness. A preferred doctor bar 304 is made of spring steel and is spaced apart from the print roller 222. Alternatively, a third roller may be used to regulate film thickness.

The speed of the web 100 relative to the speed of the film 220 controls the application of the liquid bead bond on upweb or downweb portions 110 of FIG. 2 of the protrusions 104. In a first situation, the film 220 travels faster than the protrusion 104, and the nip pressure is such that the top surface 106 contacts the print roller 220. Additional bead bond accumulates on the upweb portions 110A of the protrusion 104 and in the space between the tops 106 and the print roller 222. As the web advances into the nip 302, the additional bead bond is displaced to the sides 108 including upweb portions 110A. The downweb facing portions 110B of the sides 108 and the tops 106 remain substantially free from a layer of liquid bead bond.

Alternatively, when the protrusions 104 move faster than the film 220 and contacts the print roller 222, the protrusions 104 tend to sweep or wipe the liquid bead bond onto the sides 108 including downweb portions 110B of the protrusion 104 while the upweb portion 110A of the side 108 and the top 106 remains substantially free from a layer of bead bond.

Figure 4E:
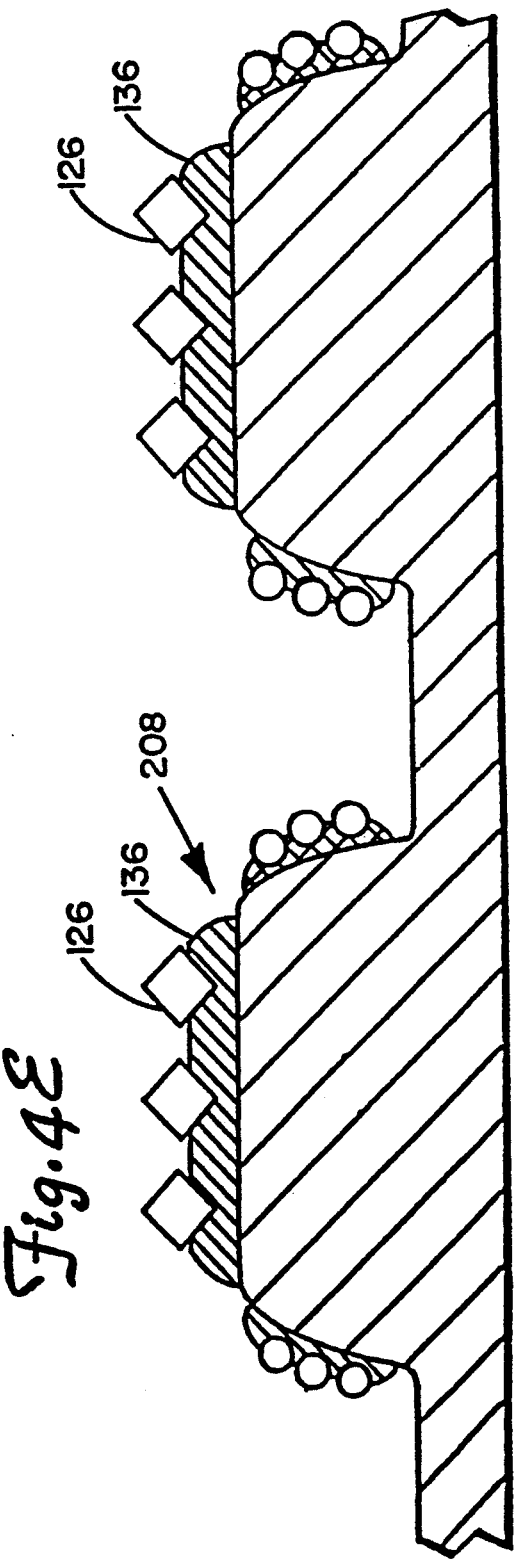
Figure 4A:
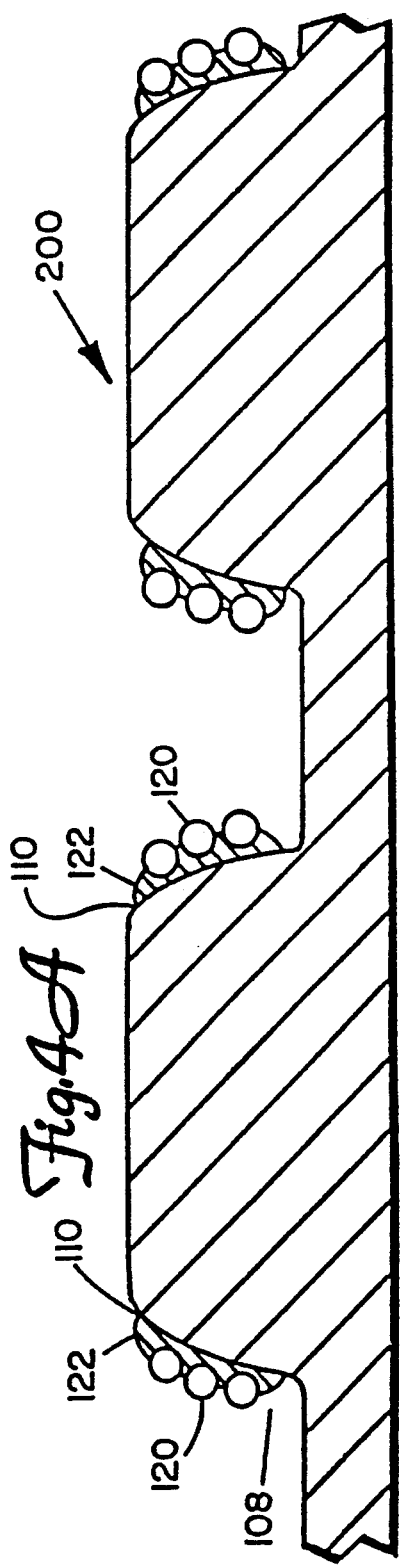

A product 200 of the process of this invention, is illustrated in FIG. 4A, with retroreflecting beads 120 partially embedded in a bead bond layer 122 on the side 108 including the top portions 110.

Figure 4B:
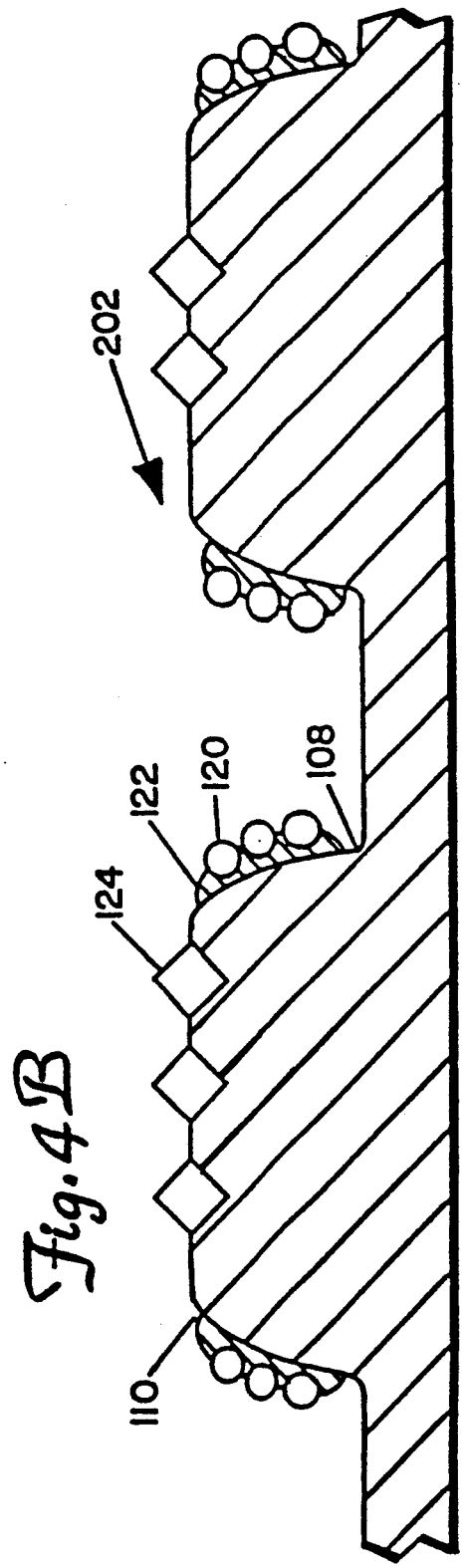

An alternative embodiment 202, as shown in FIG. 4B, includes skid preventing particles 124 partially embedded in the top 106 of the protrusions 104 in addition to the retroreflecting beads 120 partially embedded in the bead bond layer 122 on the side surface 108 including the top portions 110. Production of the embodiment 202 may be accomplished by employing a web 100 with skid prevention particles embedded into the surface.

In a third alternative embodiment 204, as shown in FIG. 4C, the retroreflecting beads 120 are partially embedded in a bead bond layer 130 on a portion of the side 108 including the top portion 110A. The embodiment 204 may be produced by moving the web 100 approximately 10% slower than the bead bond film 220 through the nip 302. The difference in speed between the relatively slower web 100 and the relatively faster bead bond film 220 results in selective application of the bead bond layer 130 on the upweb portions of the protrusions. The embodiment 204 is particularly advantageous for use as a specialized pavement marker since retroreflection is possible from a a first direction but not from a second direction.

In another embodiment 206, as shown in FIG. 4D, retroreflecting beads 120 are partially embedded in a first bead bond layer 132 facing a first direction and a second bead bond layer 134 facing a second direction. The embodiment 206 is made by a first pass through the nip 302 with a first speed differential and a second pass through the nip 302 with a second nearly opposite differential speed between the web 100 and film 220. Because the pigments of the bead bonds 132 and 134 contribute to the color of the retroreflected light, a first retroreflected light color may be reflected in a first direction and a second retroreflective color of light may be retroreflected in a second direction. The different colors require different colored pigments in the bead bond. Most preferred are $TiO_2$ pigment to provide a white retroreflector and lead chromate pigment to provide a distinct yellow retroreflector for the second direction. Other color/pigment combinations may be used to provide alternative signal information to drivers.

In another embodiment 208, as shown in FIG. 4E, a third layer of bead bond 136 is subsequently applied to the top of the protrusions of the embodiment 206 of FIG. 4D. The third layer of bead bond 136 is applied to the top of the protrusions by eliminating the nip pressure or operating the rollers at a fixed gap. The top layer is suitable for embedding particles 126, such as skid prevention particles or retroreflecting beads.

EXAMPLE 1

A 10.2 cm by 30.5 cm portion of preferred base sheet was provided. The base sheet was passed through the nip of a gravure type coater to selectively apply bead bond. The bead bond was a vinyl solution including a white pigment ($TiO_2$). A doctor blade was used to regulate the thickness of the film. Immediately after application of the bead bond, the base sheet was flood coated with 165 micrometer diameter, 1.75 index of refraction beads. The white vinyl bead bond was solidified by heating in an oven at approximately 121° C. for 10 minutes. Excess beads were removed by brushing. The resulting product had beads and bead bond selectively applied to pairs of protrusion walls facing a first direction and was relatively free of beads and bead bond in a second direction. The product demonstrated good qualitative retroreflection from the first direction and little or none from the second direction.

EXAMPLES 2–16

Examples 2 and 3–16 are presented in Table II. For each example, the table presents base sheet pattern dimensions, type of bead bond and film thickness and the type and density of retroreflective beads. Examples 2–10, 15 and 16 employed beads 165 micrometer in diameter. Examples 11-14 employed beads 525 micrometer in diameter. Example 2 is a comparative example of pavement marking material disclosed in U.S. Pat. No. 4,388,359 in which beads are embedded into the retroreflective sheet. Application of bead bond in examples 3-14 was carried out by coating a release sheet with a film of the liquid bead bond solution. The coated release sheet was immediately inverted and contacted with the tops of the protrusions. A hand roller was used to squeeze the release sheet against the protrusions. The release sheet was stripped off and the base sheet flood coated with the retroreflective beads. The specific luminance was measured subsequent to solidification of the bead bond. Examples 15 and 16 were produced using the continuous process depicted in FIG. 3.

As indicated by the results of Table II, all the examples exceeded the specific luminance of comparative example 2, while employing far fewer beads. The examples demonstrate that the invention is useful for selective application of many types of retroreflectors including specular reflective beads (examples 13 and 14) and ceramic beads (examples 8-10, 15, and 16). The examples further demonstrate that the invention is useful with both vinyl and urethane bead bonds and is not limited to a single base sheet pattern. The most important point of the examples in Table II is that the beads have been selectively applied to surfaces which are highly effective in providing retroreflection when illuminated at high incidence angles.

TABLE II

| Ex. | Base Sheet Pattern[1]/ Depth[2] | Bead Bond Type[3]/ Thick[4] | Beads n/ %[5] | Sp. Luminance[6] 86.0/ 0.2*[7] | 86.5/ 1.0*[8] |
|---|---|---|---|---|---|
| 2 | 6.4 * 3.2 1100 | V | 1.75 100% | 1090 | 680 |
| 3 | 6.4 * 3.2 1000 | V 300 | 1.75 50% | 4220 | 2500 |
| 4 | 6.4 * 3.2 1800 | V 300 | 1.75 35% | 3560 | 2270 |
| 5 | 6.4 * 3.2 2500 | V 300 | 1.75 13% | 2350 | 1530 |
| 6 | 6.4 * 2.4 1000 | V 300 | 1.75 50% | 4440 | 2650 |
| 7 | 6.4 * 2.4 1000 | V 300 | 1.75 25% | 3260 | 2120 |
| 8 | 6.4 * 3.2 1000 | U 250 | 1.76[9] 50% | 1680 | 980 |
| 9 | 6.4 * 3.2 1800 | U 250 | 1.76[9] 35% | 1780 | 1060 |
| 10 | 6.4 * 3.2 2500 | U 250 | 1.76[9] 13% | 1450 | 850 |
| 11 | 6.4 * 3.2 1000 | V 500 | 1.9 25% | 12,700 | 4780 |
| 12 | 6.4 * 3.2 1800 | V 500 | 1.9 15% | 14,300 | 5430 |
| 13 | 6.4 * 3.2 1000 | V 400 | 1.92[10] 25% | 22,500 | 8070 |
| 14 | 6.4 * 3.2 1800 | V 500 | 1.92[10] 15% | 40,200 | 13,900 |
| 15 | 6.4 * 3.2 1100 | U 300 | 1.76[9] 35% | 4130 | 2420 |
| 16 | 6.4 * 3.2 | U | 1.92[9] | 7190 | 2850 |
| | 1100 | 300 | 35% | | |

[1]Pattern dimensions as wall length of square protrusions in mm * space between protrusions in mm.
[2]Depth of embossed pattern, or height of protrusions in micrometers.
[3]Composition of bead bond:
"V" indicates white vinyl as in U.S. 4,117,192
"U" indicates polyurethane preferred composition described hereinabove.
"N" indicates no bead bond present in comparative example using material of U.S. 4,388,359.
[4]Film thickness in micrometers.
[5]Percent of flood coat on surface as indicated by bead weight gain of examole divided by bead weight gain of totally coated surface.
[6]Specific luminance, defined in Federal Test Method Standard 370, section 3.1.2, is a photometric quantity used to specify the performance of retroreflective materials.
[7]Specific luminance of example when illuminated at 86.0° to a perpendicular to top surface and observed at a divergence angle of 0.2° to illumination angle. Expressed in mcd/m²/lx.
[8]Specific luminance of example when illuminated at 86.5° to a perpendicular to upper surface and observed at a divergence angle of 1.0° to illumination angle. Expressed in mcd/m²/lx.
[9]Ceramic type beads as described in U.S. application No. 35,989, filed April 8, 1987.
[10]Beads having a refractive index of 1.9, coated with silver. Exposed surfaces etched to remove silber subsequent to solidification of bead bond.

EXAMPLE 17

A 10.2 cm wide preferred web as previously described was provided. The preferred polyurethane bead bond, at a viscosity in the range of approximately 4000-6000 cps, was applied by a continuous process. The film thickness on the print roller was approximately 300 micrometers. A uniform distribution of bead bond layer between the upweb and downweb portions of the protrusions was accomplished by having the web speed exceeding the film speed by approximately 3%. To apply the bead bond layer substantially on the sides including downweb portion 110B, the web speed exceeded the film speed b approximately 10%. In order to apply the bead bond layer substantially to the sides including upweb portion 110A, the web speed was slowed to approximately 90% of the film speed. The products produced resembled FIGS. 4A and 4C.

The subject invention provides several advantages over the prior art. First, because the retroreflecting beads are applied only to the area in which they are most effective, bead usage per unit area of material is substantially decreased. Decreased bead usage not only allows the possibility of saving money on standard beads such as 1.5 refractive index beads, 1.75 refractive index beads or 1.9 refractive index beads, but also allows more efficient beads to be employed in retroreflective sheets. For example, ceramic based retroreflective beads as described in copending application Ser. No. 35,989, filed Apr. 8, 1987, may be employed.

An additional advantage of selective application of beads to selected surfaces of the base sheet is an ability to avoid extensive "gray cast" areas on the retroreflecting material. Such "gray cast" areas are caused by partially exposed beads on the base sheet. Because bead bond is applied only as a discontinuous layer to selected surfaces, surfaces free of bead bond demonstrate a daytime color unaffected by beads; that is, free of a "gray cast." Minimizing "gray cast" areas has been reported in U.S. Pat. No. 4,388,359 to maintain the desired white or other daytime color of the sheet material.

The product is more flexible than the 100% bead bond coated base sheet. The conformance and flexibility are substantially the same as an uncoated web 100.

Improved conformance allows for easier application to roads.

Although the present invention has been described with reference to preferred embodiments, workers skilled in the art will recognize that changes may be made in form and detail without departing from the spirit and scope of the invention.

What is claimed is:

1. A skid preventative sheet, which comprises:
   (a) a resilient polymeric base sheet having a front surface;
   (b) a plurality of a integral protuberances projecting from the front surface, there being a plurality of such protuberances across the width and down the length of the front surface of the polymeric base sheet;
   (c) a discontinuous layer of bonding material being located on the protuberances and being substantially absent from the front surface in the regions between the protuberances; and
   (d) a plurality of skid preventative particles partially embedded in the layer of bonding material and being substantially absent from the front surface in the regions between the protuberances.

2. The skid preventative sheet of claim 1, wherein the protuberances are substantially identical and are disposed in a substantially regular repeating pattern upon the base sheet.

3. The skid preventative sheet of claim 2, wherein the protuberances have a height at from 1.0 to 2.5mm.

4. A sheet which comprises:
   (a) a polymeric base sheet having a plurality of protuberances and valleys located on a first side of the polymeric base sheet;
   (b) a layer of bonding material being located on a top surface of the protuberances and being substantially absent from the valleys; and
   (c) a plurality of skid preventative particles being secured to the layer of bonding material and being substantially absent from the valleys.

5. The sheet of claim 4, wherein the protuberances and valleys are integral with the base sheet, and the skid preventative particles are partially embedded in the layer of bonding material on the top surface of the protuberances.

6. A method of applying a skid preventative sheet to a roadway, which comprises placing the skid preventative sheet of claim 1 on the roadway surface.

7. A method of covering at least a portion of a road with a sheet, which comprises: placing the sheet of claim 4 on the road.

8. The method of claim 6, wherein the skid preventative sheet is placed on a pavement surface.

9. The method of claim 7, wherein the sheet is placed on a pavement surface.

* * * * *

UNITED STATES PATENT AND TRADEMARK OFFICE
CERTIFICATE OF CORRECTION

PATENT NO. : 5,227,221
DATED : July 13, 1993
INVENTOR(S) : Thomas P. Hedblom

It is certified that error appears in the above-indentified patent and that said Letters Patent is hereby corrected as shown below:

Col. 9, line 41, "V" should be --N--.

Signed and Sealed this

Twenty-sixth Day of April, 1994

*Attest:*

BRUCE LEHMAN

*Attesting Officer*   *Commissioner of Patents and Trademarks*